US009290936B2

(12) United States Patent
Dickey et al.

(10) Patent No.: US 9,290,936 B2
(45) Date of Patent: Mar. 22, 2016

(54) PORTABLE FLOOR

(71) Applicant: SICO INCORPORATED, Edina, MN (US)

(72) Inventors: Christopher C. Dickey, West St. Paul, MN (US); Todd A. Schilling, Verona, WI (US)

(73) Assignee: Sico Incorporated, Edina, MN (US)

( * ) Notice: Subject to any disclaimer, the term of this patent is extended or adjusted under 35 U.S.C. 154(b) by 0 days.

(21) Appl. No.: 14/176,806

(22) Filed: Feb. 10, 2014

(65) Prior Publication Data

US 2015/0225946 A1 Aug. 13, 2015

(51) Int. Cl.
*E04C 1/00* (2006.01)
*E04B 5/02* (2006.01)
*B32B 37/14* (2006.01)
*E04F 15/02* (2006.01)
*E04F 15/10* (2006.01)

(52) U.S. Cl.
CPC ............... *E04B 5/02* (2013.01); *B32B 37/144* (2013.01); *E04F 15/02* (2013.01); *E04F 15/02183* (2013.01); *E04F 15/107* (2013.01); *E04F 2201/0107* (2013.01); *E04F 2201/0558* (2013.01)

(58) Field of Classification Search
CPC .......... E04B 5/02; E04F 15/02; E04F 15/107; E04F 15/02183; E04F 2201/0107; E04F 2201/0558; B32B 37/144
USPC .......... 52/584.1, 582.2, 592, 177, 263, 220.5, 52/582.1, 127.7, 127.11, 127.8, 127.9, 52/313, 586.1, 592.1, 36; 404/35, 36, 40; 403/253, 252, 257, 259; 312/265.5
See application file for complete search history.

(56) References Cited

U.S. PATENT DOCUMENTS 2,340,864 A 2/1944 Carpenter
2,822,585 A 2/1958 Baruch
(Continued)

FOREIGN PATENT DOCUMENTS

WO WO 90/00656 1/1990
WO WO 96/04441 2/1996
(Continued)

OTHER PUBLICATIONS

International Search Report and Written Opinion for Application No. PCT/US2015/013300 mailed Apr. 21, 2015.

*Primary Examiner* — Mark Wendell
(74) *Attorney, Agent, or Firm* — Merchant & Gould P.C.

(57) ABSTRACT

A portable floor includes floor panels connected in an edge to edge relationship to form an extended temporary floor surface. Each of the panels includes a foam layer having a top face and a bottom face with a first aluminum sheet placed on the top face and a second aluminum sheet placed on the bottom face. The aluminum sheet placed on the bottom face is coated with a paint over the bottom surface while a laminate is applied over the upper aluminum sheet. Extruded edge pieces attach along the sides of the floor panels and include complementary tongues along two edges and grooves along the other two edges. The panels also include latches for securing the edges together.

17 Claims, 8 Drawing Sheets

(56) References Cited

U.S. PATENT DOCUMENTS

| | | | |
|---|---|---|---|
| 2,885,039 A | 5/1959 | Macfarland, Jr. | |
| 3,462,897 A * | 8/1969 | Weinrott | 52/169.14 |
| 3,567,260 A | 3/1971 | Norris | |
| 3,587,199 A | 6/1971 | Henry | |
| 4,020,613 A | 5/1977 | Reynolds et al. | |
| 4,340,929 A | 7/1982 | Konikoff et al. | |
| 4,417,430 A | 11/1983 | Loikitz | |
| 4,693,630 A | 9/1987 | Giovannetti | |
| 4,988,131 A | 1/1991 | Wilson et al. | |
| 5,022,200 A | 6/1991 | Wilson et al. | |
| 5,157,890 A | 10/1992 | Jines | |
| 5,323,564 A | 6/1994 | Mensching et al. | |
| 5,433,053 A | 7/1995 | Tulloch | |
| 5,616,389 A | 4/1997 | Blatz | |
| 5,630,304 A | 5/1997 | Austin | |
| 5,743,056 A | 4/1998 | Balla-Goddard et al. | |
| 5,918,437 A | 7/1999 | Dobija | |
| 5,953,878 A | 9/1999 | Johnson | |
| 6,032,427 A | 3/2000 | Randjelovic | |
| 6,119,427 A | 9/2000 | Wyman et al. | |
| 6,128,881 A | 10/2000 | Bue et al. | |
| 6,189,283 B1 | 2/2001 | Bentley et al. | |
| 6,389,773 B1 | 5/2002 | Reuter et al. | |
| 6,460,306 B1 | 10/2002 | Nelson | |
| 6,662,508 B1 | 12/2003 | Else | |
| 6,691,480 B2 | 2/2004 | Garcia | |
| 6,824,851 B1 * | 11/2004 | Locher et al. | 428/76 |
| 6,854,215 B1 | 2/2005 | Kaiser | |
| 7,137,229 B2 | 11/2006 | Pervan | |
| 7,516,587 B2 | 4/2009 | Barlow | |
| 7,543,417 B2 | 6/2009 | McIntosh et al. | |
| 7,621,091 B2 | 11/2009 | Dickey et al. | |
| 2006/0165972 A1 | 7/2006 | Chimelak et al. | |
| 2009/0313915 A1 | 12/2009 | Kellner | |
| 2010/0183398 A1 * | 7/2010 | Nelson et al. | 410/129 |
| 2010/0293868 A1 * | 11/2010 | Holzworth | 52/79.5 |
| 2011/0000405 A1 | 1/2011 | Clark et al. | |

FOREIGN PATENT DOCUMENTS

| | | |
|---|---|---|
| WO | WO 97/21011 | 6/1997 |
| WO | WO 01/47706 A1 | 7/2001 |
| WO | WO 2010/064916 A1 | 6/2010 |

* cited by examiner

PORTABLE FLOOR

BACKGROUND OF THE INVENTION

1. Field of the Invention

The present invention relates to inter-connectible portable floor panels to be secured together in an edge-to-edge relationship to form an extended floor suitable for indoor and/or outdoor use and in particular to floor panels having cores made with a horizontally unsymmetrical layer configuration.

2. Description of the Prior Art

Portable floors are generally configured with interlocking square or rectangular floor sections or panels and used to provide a hard surface floor that may be set up over carpeting or other surfaces on a temporary basis by joining floor sections together in an edge to edge relationship. Latches or other connections are provided along the edges to secure adjacent sections together to form an extended floor surface.

Portable floors are used for a variety of purposes and are particularly useful in the hospitality and entertainment industries for providing temporary dance floors. It is often necessary to provide a temporary smooth, hard surface for dancing or other activities that can be removed so the space may be used for other activities. The floors are usually connected together in an edge to edge fashion with releasable latches along the edges. Examples of such portable floors include U.S. Pat. Nos. 3,310,919; 4,988,131; 6,128,881; 6,189,283 and 7,621,091, all assigned to Sico Incorporated, the Assignee of the present invention. Although such floors are useful and generally reliable, temporary portable floors suffer from problems related to warping of the panels. Many dance floor panels have a wood core that is relatively heavy. Warping is more common for floors that may be used in outdoor elements and placed over grass where the temperature gradient can be high between an upper surface of the panels exposed to the sun and the bottom surface of the panels that may be placed over cooler ground or wet grass. Temperature differences may be substantial between the upper surface and lower surface. Moreover, the humidity levels may vary substantially between the top exposed surface and the lower surface. This problem is compounded should rain occur or there be standing water. To overcome such warping problems and to avoid trapping moisture, floor panels have been made without a wood core and incorporate other water resistant materials. Such designs may include an unreinforced, lightweight foam core with layers balanced above and below the foam core. Although such balanced layered construction floor panels are generally satisfactory, the decorative layer applied to the top and bottom may trap moisture and in some instances, may lead to warping issues.

It can be seen that an improved floor panel and floor system is needed that is lightweight, has rugged construction of all weather materials that resists warping. In addition, such a floor panel should be easy to connect to other similar floor sections and have a strong attachment between the floor panel core and the edge portions. Such a panel should also utilize lightweight materials and eliminate a bottom laminate that may absorb moisture. The present invention addresses these as well as other problems associated with portable floors and floor panels.

SUMMARY OF THE INVENTION

The present invention is directed to a floor system made from floor panels that are connectable to other similar floor panels to form a temporary extended floor surface. The panels are joined to form a temporary dance floor such as may be used in hotels, halls, auditoriums and the like. Typical panels are 4 feet by 4 feet, but other sizes can be used. The panels of the present invention are weather proof and water proof and suitable or indoor and/or outdoor use. Each floor section generally includes a rectangular panel with edging formed around the periphery of the panel. The edging includes connectors for aligning and connecting to complementary edges of other similar floor sections. In one embodiment, two edges have groove type connectors and two edges have complementary tongue type connectors for forming tongue and groove connections. In addition, each edge has one of two complementary latching assemblies for locking the floor sections together. In one embodiment, the edging is formed of extruded aluminum or other weather resistant plastic, metals or alloys.

The floor panel is formed entirely of weather resistant materials to resist warping and other problems associated with moisture trapped in floor panels. The panel has a planar core assembly of multiple horizontal water resistant layers combined to form a high strength, yet lightweight core. The core assembly includes an inner horizontal foam layer. The foam layer is a structural reinforced foam that provides strength and rigidity to the floor panel.

Immediately above and below the foam layer are nonferrous layers formed of aluminum sheets, a pultrusion or molded plastic. A first nonferrous sheet adhesively mounts to the bottom face of the structural foam layer. For materials such as aluminum, the first nonferrous sheet has a protective paint or other protective coating applied over its bottom surface. The second nonferrous sheet adhesively mounts to the top face of the structural foam layer.

A top decorative layer such as a laminate or vinyl flooring material is applied over the top nonferrous sheet. The decorative layer may have a graphic design such as a wood grain or a parquet pattern. The foam core and the top and bottom nonferrous layers and top decorative layer are glued together. Unlike prior floors, the layers are not symmetrical about the structural foam core layer. A laminate is not applied to the underside of the bottom nonferrous sheet. Therefore, the bottom of the panel construction has a painted nonferrous surface and cannot absorb moisture. Such a construction uses lightweight completely waterproof weather resistant materials and overcomes problems related to moisture absorption into a bottom laminate.

To manufacture the panels, aluminum sheets are treated to remove oxides and applied over both faces of the structural foam layer. If other nonferrous material is used, the sheets are pretreated if necessary. The layers are joined by adhesive to form a panel core assembly. The layers are pressed together to spread the adhesive evenly and the foam layer with aluminum pans or other materials is passed between pinch rollers to remove bubbles. The assembly may be stored to later receive a decorative layer having a pattern selected from a collection of patterns. The selected decorative layer is adhesively attached on the upper surface of the top nonferrous sheet. The decorative layer is pressed onto the assembly and then the assembly passes through pinch rollers to remove gas and bubbles and ensure proper spread of the adhesive and a smooth upper surface. In this manner, a lightweight, strong and easily assembled dance floor section is obtained with all materials being resistant to warping even when used outdoors.

Complementary latch assemblies mount into a recess along each edge of the floor panel. Anchor elements inserted into slots formed in the panel core assembly provide a stronger and more rigid mounting than is possible by mounting directly into the foam material.

Weather resistant extruded elements are mechanically affixed to the sides of the panel core assembly to form a complete panel. It can be appreciated that the assembled floor panel is made only from weather resistant materials that are lightweight and eliminate problems associated with warping.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings wherein like numerals and letters indicate corresponding elements throughout the several views.

DETAILED DESCRIPTION OF THE PREFERRED EMBODIMENT

Figure 1:
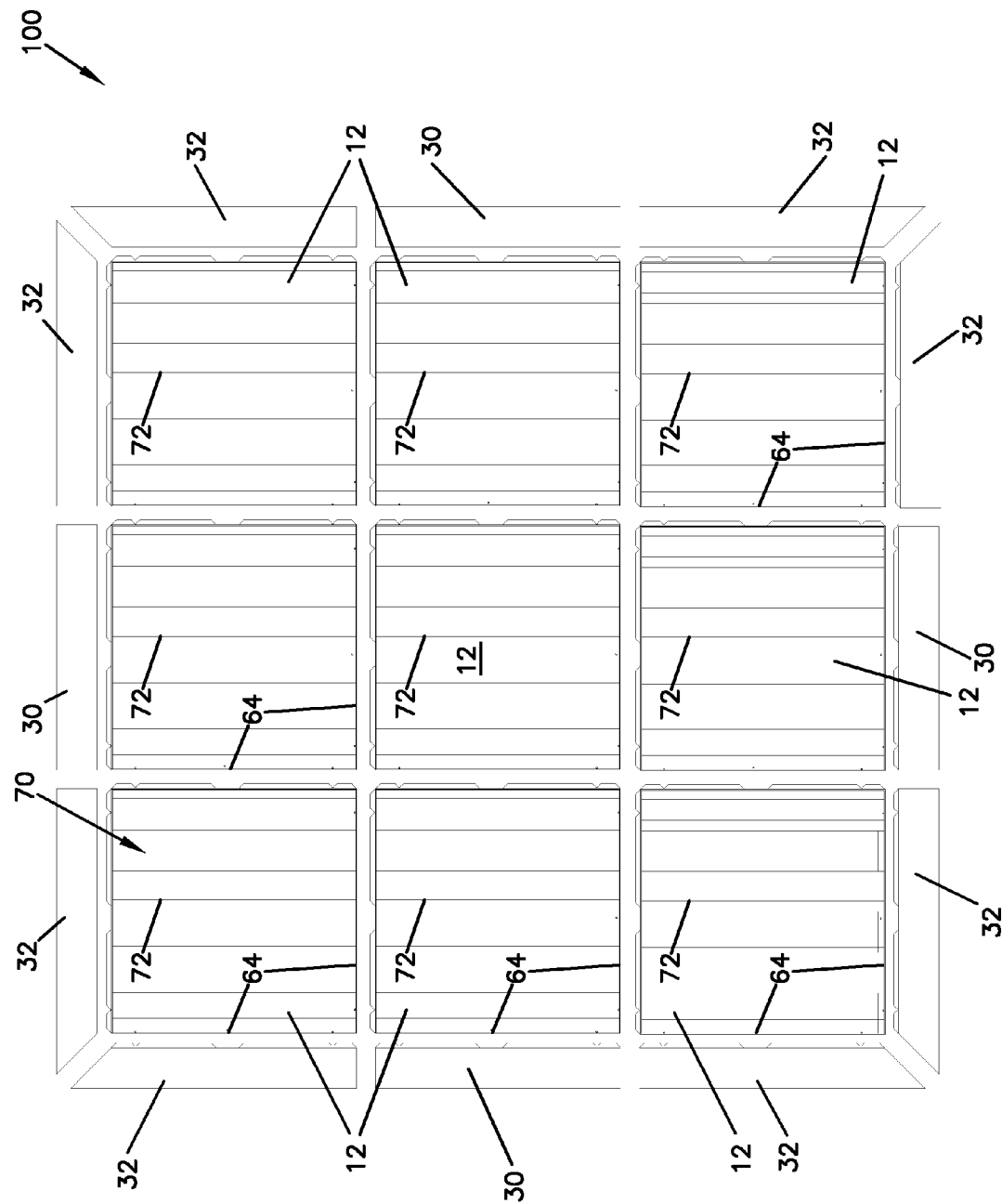
FIG. 1 is a top plan view of a portable floor system according to the principles of the present invention.
Figure 2:
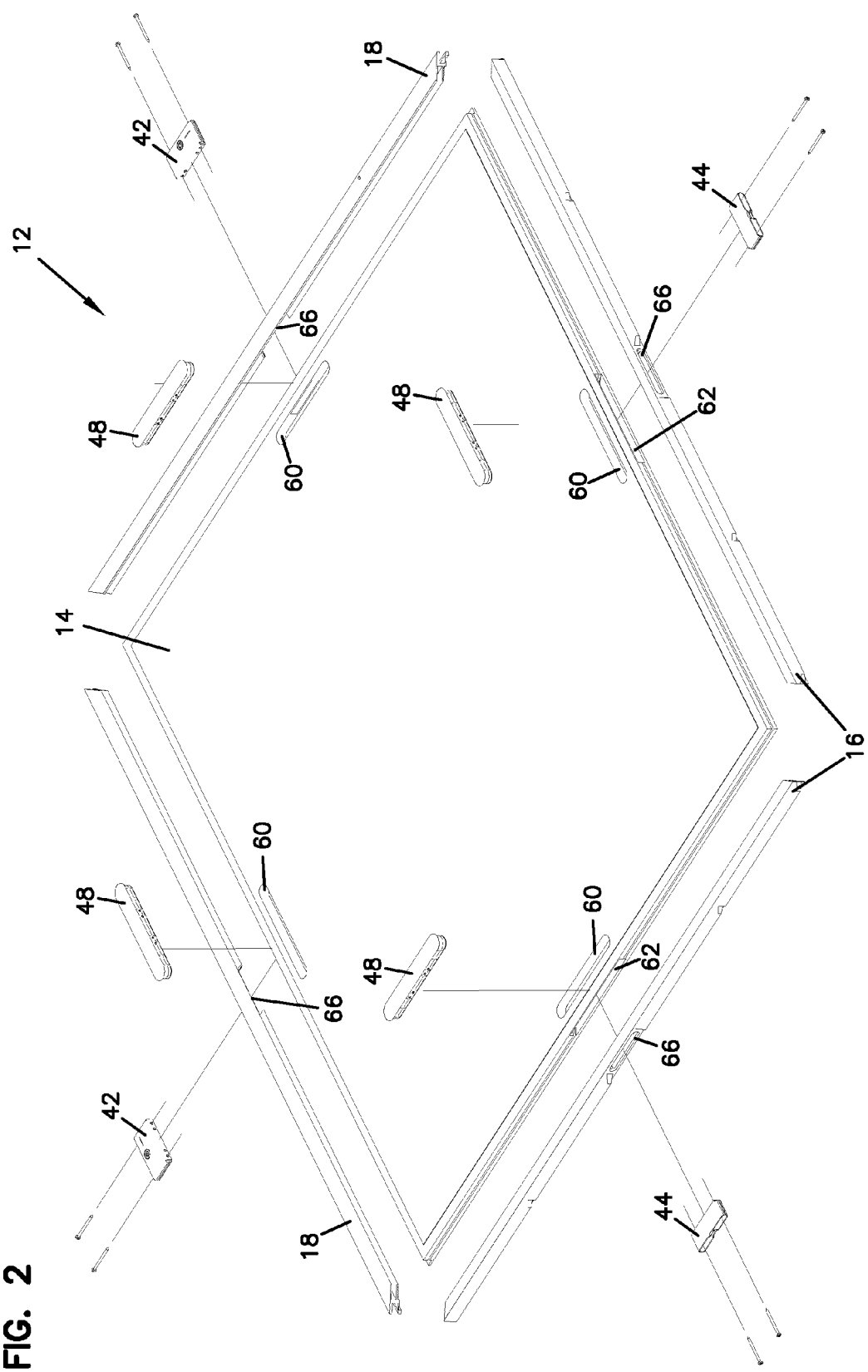
FIG. 2 is a bottom exploded perspective view of a floor panel for the portable floor system shown in FIG. 1.
Figure 3:
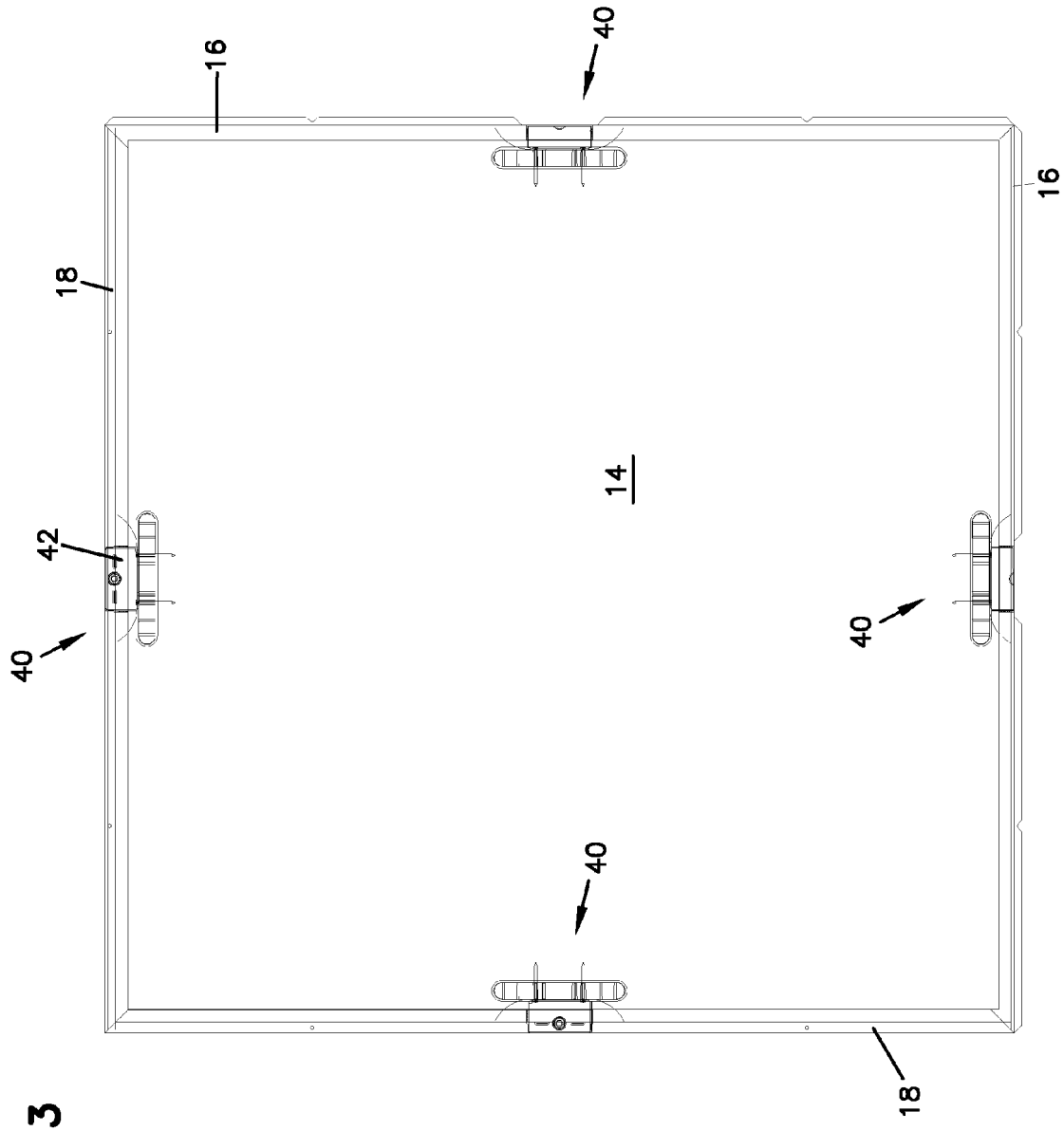
FIG. 3 is a top view of the floor panel shown in FIG. 2 with portions removed to show the locking assembly.

Referring now to the drawings and in particular to FIGS. 1-3, there is shown a portable floor system generally designated (100). The floor system (100) includes a plurality of generally rectangular floor panels (12) joined in an edge to edge relationship to form an extended continuous floor surface. The shape and size of the floor (100) may be changed by adding and/or removing floor panels (12). The floor panels (12) generally include a lightweight planar panel core assembly (14) with extruded edge elements including tongue element (16) along two of the edges and groove elements (18) along the other two edges. With this configuration, the tongues (16) insert into the complementary grooves (18) and provide engagement with adjacent floor panels (12) along their edges.

Figure 5:
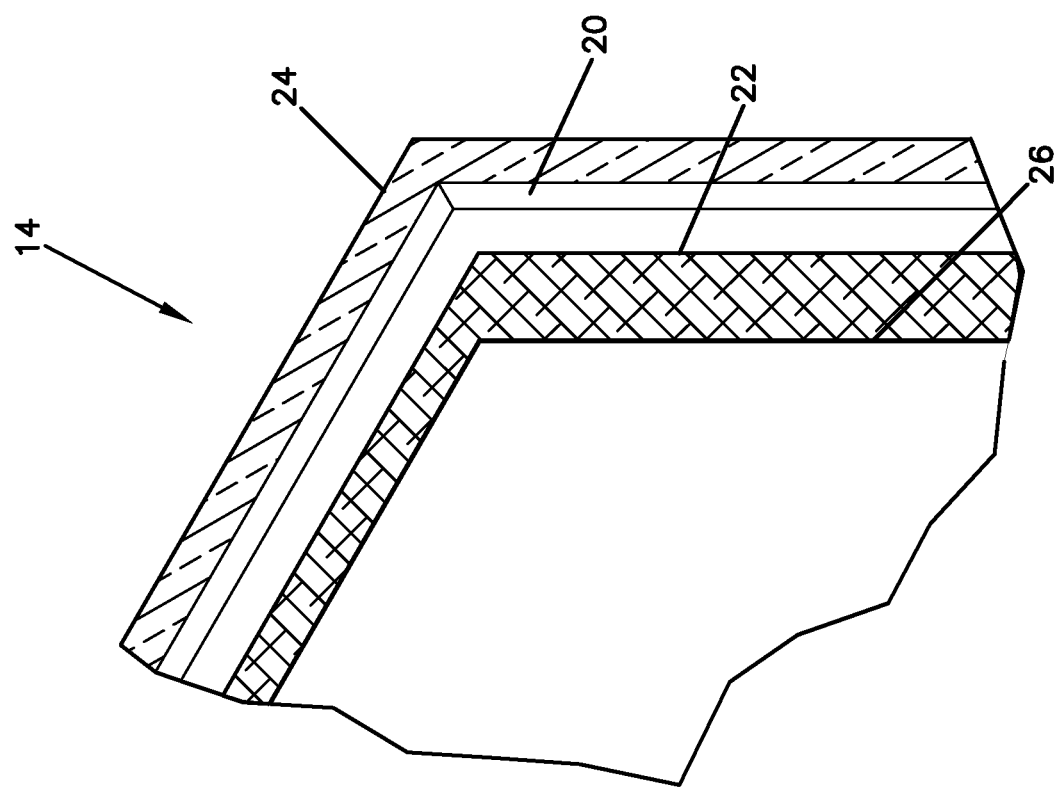
FIG. 5 is a side sectional view of a portion of the panel shown in FIG. 2.
Figure 10:
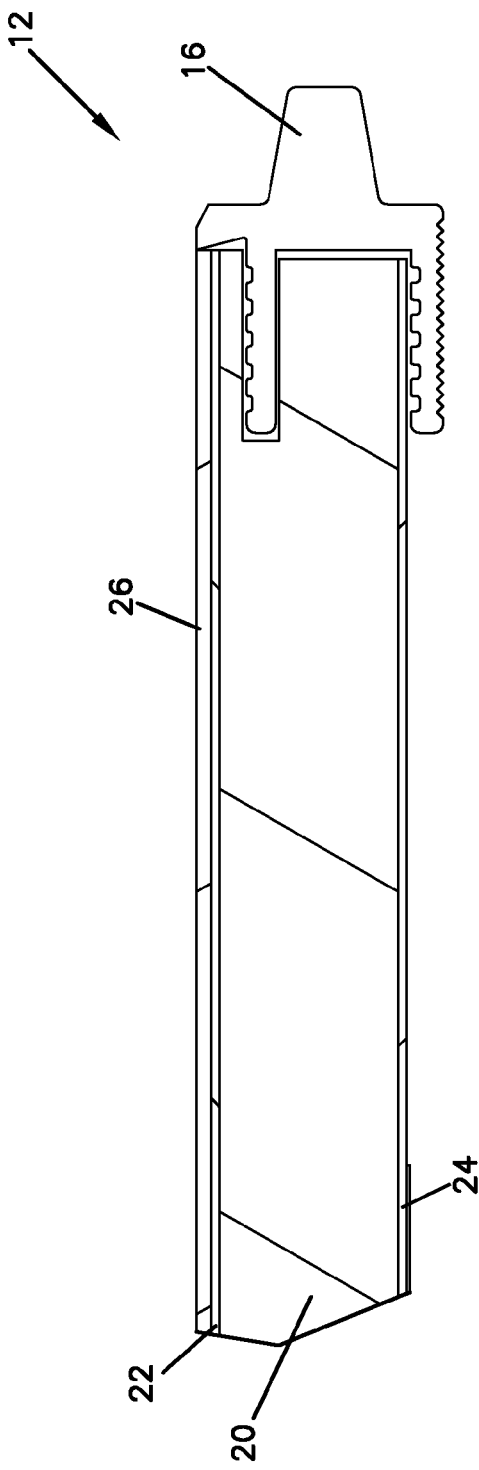
FIG. 10 is a side sectional view of the floor panel shown in FIG. 5 and a male edge element.
Figure 11:
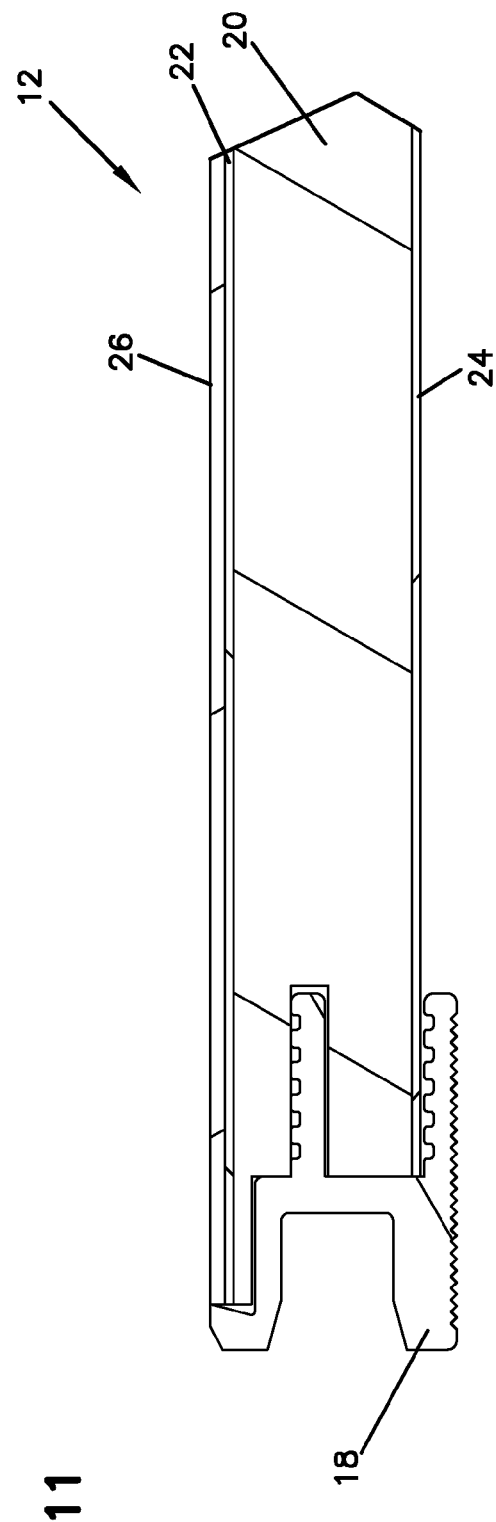
FIG. 11 is a side sectional view of the floor panel shown in FIG. 5 and a female edge element.

Referring now to FIGS. 5, 10 and 11, the planar core assembly (14) typically includes a lightweight center foam core layer (20). The center foam core layer (20) is a structural closed cell foam that includes reinforced fiberglass. The fiberglass strands are dispersed throughout the foam and provide added strength. The foam is lightweight and has a density of approximately twenty pounds per cubic foot. The closed cell foam is made of environmentally stable polyurethane and is waterproof and does not absorb moisture. By using a waterproof foam layer (20), the floor panels (12) are better suited for use in outdoor conditions and have greater resistance to warping. Moreover, because of the strength provided by the reinforced structural foam layer (20), the other layers forming the panel core assembly (14) can be thinner and thus weigh less.

The panel core assembly (14) has an unsymmetrical or unbalanced construction about a horizontal plane extending through the foam core layer (20). Bonded to the top and bottom of the center reinforced structural foam layer (20) are nonferrous sheets (22 and 24). The sheets (22, 24) are typically aluminum sheets, but other materials such as a molded plastic or a pultrusion could also be used. The top aluminum layer (22) is adhesively mounted to the upper surface of the reinforced structural foam layer (20). Similarly, the bottom aluminum sheet layer (24) is adhesively mounted to a bottom face of the structural foam layer (20). With the reinforced foam layer (20), the aluminum sheets can be 0.030 inches thick and still have sufficient strength and structural integrity. The top aluminum layer (22) includes a laminating grade epoxy coating on both sides of the sheet (22) while the bottom aluminum sheet layer (24) includes the laminating grade epoxy coating on the face mounting to the foam core layer (20). The lower face of the bottom aluminum sheet (24) is coated with a protective paint to resist damage. The paint is water resistant for outdoor and with exposure to the elements while providing protection to the panel.

A top exterior layer (26) adhesively mounts to the upper surface of the top aluminum sheet (22). The top exterior layer (26) is a decorative layer, such as a laminate or vinyl flooring material that in combination with the aluminum sheet (22) and the foam layer (20), provides resistance to impacts such as from heels that may dent or otherwise damage other materials or configurations. The top decorative layer may include parquet, wood grain or other pattern. In some embodiments, the pattern may be a continuous repeating pattern and may provide for continuation across adjacent panels (12) when aligned. Edge elements (16 and 18) are attached along edges of the panel core assembly (14) by adhesive and mechanical engagement, as shown in FIGS. 10 and 11.

Referring again to FIG. 1, the floor system (100) includes edge trim pieces (30 and 32). The edge trim pieces (30 and 32) are configured for attaching to the tongue elements (16) and groove elements (18) and provide a safe transition from an upper surface of the floor system (100) to the underlying ground or floor upon which the portable floor (100) is placed. The edge trim pieces (30 and 32) have either conventional tongues or grooves that are similar to and complementary to the tongues and grooves (16 and 18) of the panel extrusions and connect in a similar manner. Moreover, as explained herein below, the edge trim pieces (30 and 32) have corresponding latch devices that engage complementary latch devices of the floor system (100).

Figure 4:
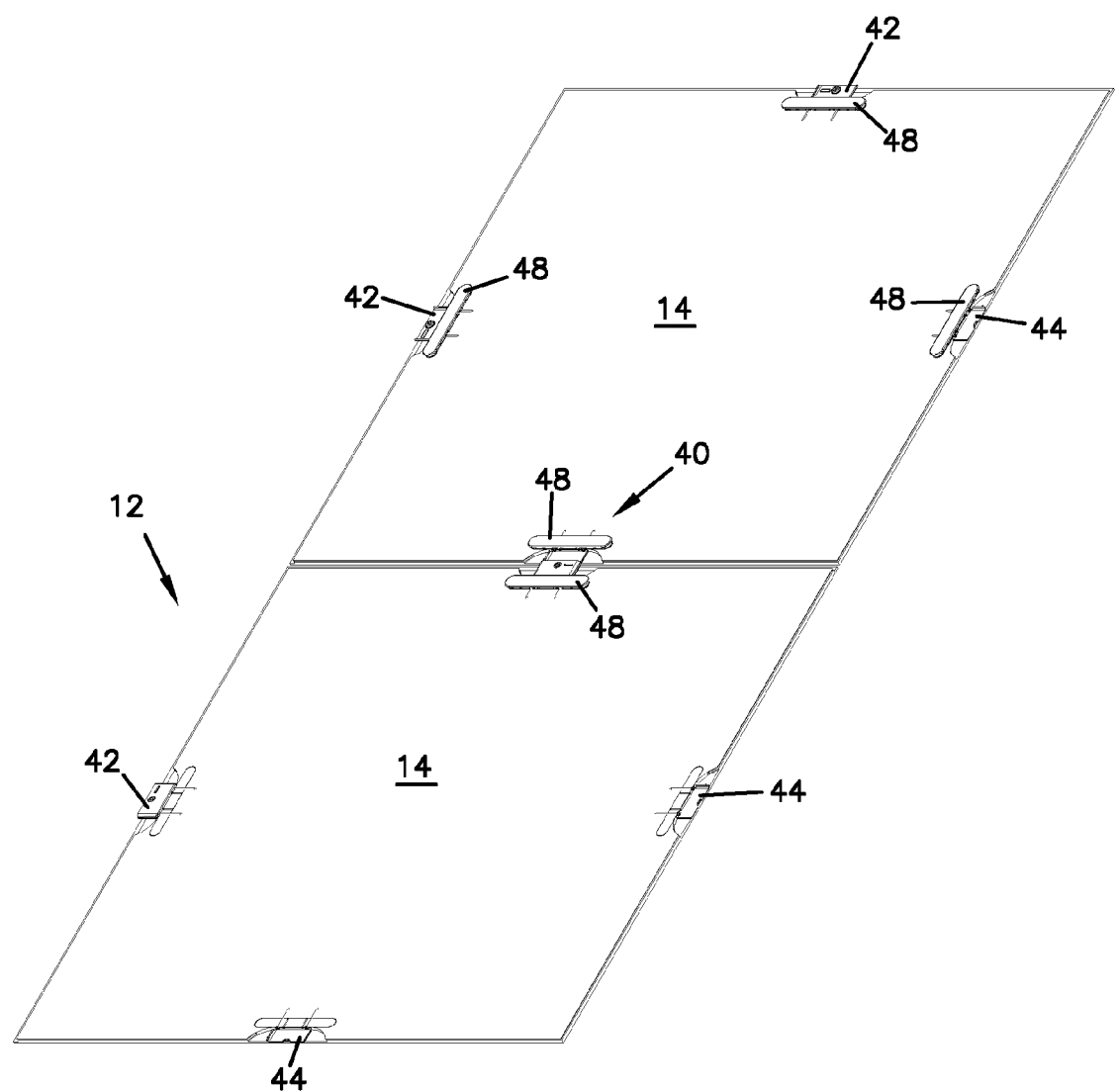
FIG. 4 is a bottom perspective view with portions removed of two panels for the floor system shown in FIG. 1 joined together.

Referring to FIGS. 2-4, the floor panels are shown with the planar portions including two tongue elements (16) and two complementary groove elements (18). The tongue elements (16) are along two adjacent sides while the groove elements (18) are along the two opposite adjacent sides. The tongue elements (16) engage the complementary groove elements (18) of adjacent panels (12) so that edges of the floor panels (12) abut one another to form an extended continuous floor surface.

Figure 7:
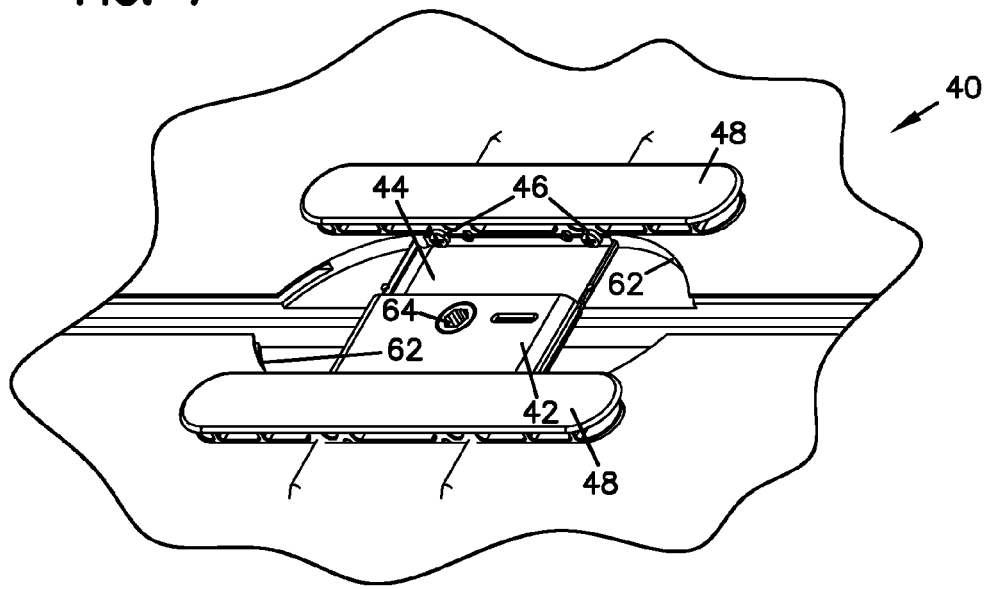
FIG. 7 is a bottom perspective view of two locking assemblies shown in FIG. 6 and their mounting to the panels with the locking assemblies connected.

The floor panels (12) are connected to one another with latch assemblies (40), as shown most clearly in FIG. 7. The lock assemblies (40) include female latches (44) and complementary male latches (42), as shown in FIGS. 2-4. Rotary latches (42 and 44) provide for pulling the edges of the floor panels (12) together to ensure a tight fit and continuous floor surface without gaps. The male rotating cam latch devices (42) have a rotatable circular cam and mount at the center of the two edges having the groove elements (18). The complementary female latch members (44) mount at the center of the two edges of the floor panels (12) having the tongue element (16) and receive and retain the rotary cam member when the latch is actuated and the cam member extends into the male latch member (42). Female cam members in the latches (44) are actuated by rotating the cam element with an Allen-type tool inserted into an orifice in the upper surface of the floor panels. When actuated and rotated, the cam latch devices (42 and 44) pull together and therefore the floor panels (12) are pulled together to ensure that there are not gaps formed in the continuous floor surface and a tight edge to edge connection is maintained between edges of adjacent panels.

Figure 6:
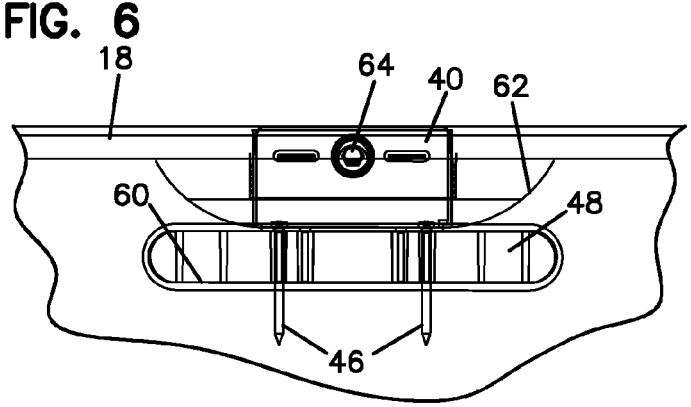
FIG. 6 is top detail view of the floor panel shown in FIG. 2 showing the locking assembly.
Figure 8:
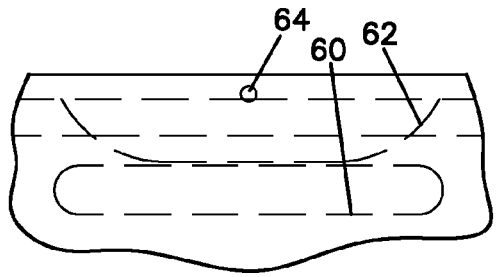
FIG. 8 is a top plan view of a portion of the panel shown in FIG. 2 showing slots for installation of the locking assembly.

As shown in FIGS. 5-7, the mounting arrangement of the latch assemblies (40) provides greater strength and more secure mounting. The latch assemblies (40) include the bodies of the female and male latch members (44 and 42) that mount directly into slots (66) formed through the tongue elements 16) and the groove elements (18) of the edges and also into slot (62) formed in the planar panel core (14). The female latch device (44) and the male latch devices (42) mount directly to an anchoring element (48). The slots are formed proximate the edges of the center core of the panel core (14). The anchoring element (48) fits into a slot (60) shown most clearly in FIGS. 2 and 8. Mounting screws extend through the back of the female and male latches (44 and 42) and insert into receiving portions (52) of the anchoring element (48), shown most clearly in FIG. 9. With this mounting arrangement, the latch assemblies (42 and 44) mount directly to the anchoring element (48) and abut the anchoring element to eliminate mounting into a less robust foam layer such as may have been required in prior art floors. The anchoring element (48) provides added support for the latch members (42) and improves installation with no special tools or application of adhesive. Moreover, the repair and replacement of latch devices is inexpensive and straight forward. If a mounting screw or orifice is stripped, a new screw may simply be inserted into an adjacent unused receiving orifice (52) in the anchoring element (48) without requiring further replacement parts. If the anchoring element (48) or other elements do require replacement, they are simply removed with a screw driver and new latch devices (42 or 44) or the anchoring element (48) may be remounted without damage to the floor panel (12).

Figure 9:
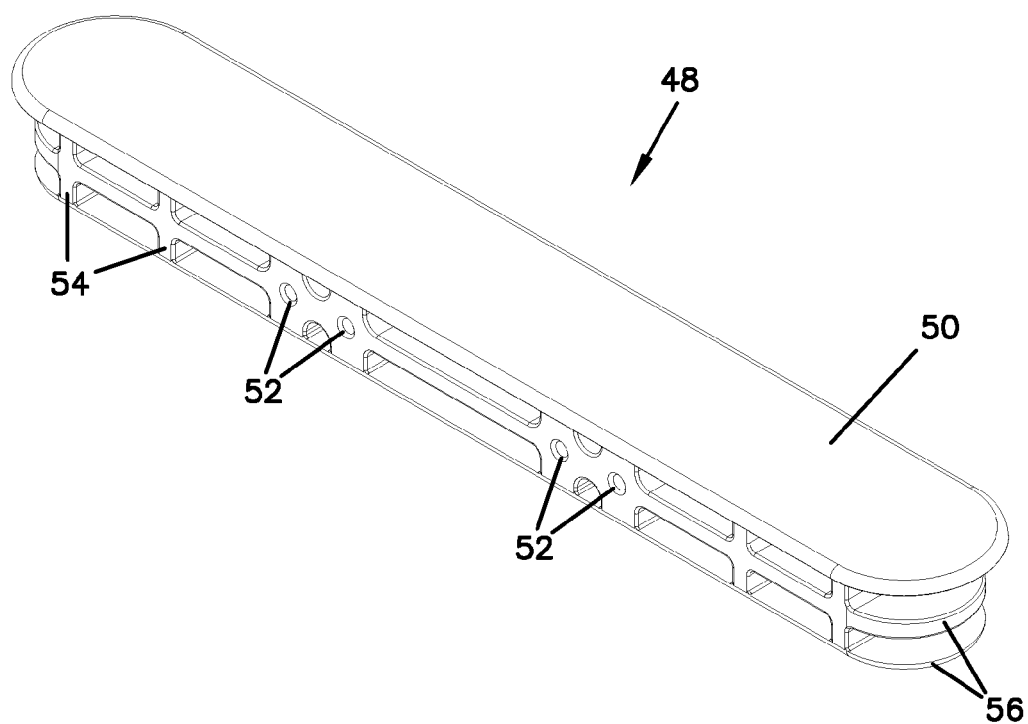
FIG. 9 is a perspective view of the anchor element for the locking assembly shown in FIG. 6.

The anchoring element shown in FIG. 9 is lightweight and waterproof and may be made of a nylon 6/6 or other suitable material. The mounting element (48) includes an upper flange (50) extending around the slot (60) and over a portion of the bottom of the floor panel (12). Horizontal ribs (56) and vertical ribs (54) provide sufficient support for the mounting portions (52) while minimizing weight. Moreover, much of the space in the recess is not filled by the mounting element, thereby saving additional weight.

The panels (12) of the floor system (100) are also inexpensive. In one embodiment of the method, the fiberglass reinforced structural foam core layer (20) is oversized with regard to the final dimensions and then the assembled layers are trimmed to the final dimensions of the panel core assembly (14). The aluminum sheets (22 and 24) are each applied separately. After each sheet (22 or 24) is applied, the partially assembled panel (14) is pressed and then passed through pinch-type rollers to ensure that any trapped gases or bubbles are removed and that the adhesive covers the entire surface of the partially assembled panel and that the adhesive is evenly applied.

These partially assembled panels (14) may be stored until a floor pattern for the top decorative layer (26) is selected. The decorative layer (26) is then applied in a similar manner to the aluminum sheets (22, 24) with the assembly being pressed together and then passed between pinch rollers a third time to ensure even and complete spreading of the adhesive as well as eliminating gas or bubbles in the assembly.

The oversized panels may then be machined to the precise dimensions prescribed and the recesses (60) may be formed in the bottom of the panel core assembly. The extruded edges are then mounted as shown in FIGS. 10 and 11. It can be appreciated that the extruded edge elements (16, 18) insert partially into the reinforced foam core layer (22) and also include ridges to ensure secure mounting. The latch assemblies (42 and 44) are then mounted to the anchor elements.

Once the panels (12) have been formed, the extended floor (100) is formed by latching adjacent panels (12) together until the desired size and shape are obtained. The extended floor is finished by attaching the trim pieces (30 and 32) around the periphery of the floor (100) to provide a transition from the floor to the underlying surface.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A portable floor panel having an unsymmetrical construction about a center core layer, the floor panel comprising:
   a layer of fiberglass reinforced closed cell water resistant foam forming the center core layer and having a top face and a bottom face, the layer of fiberglass reinforced closed cell water resistant foam comprising reinforced fiberglass strands dispersed throughout the foam;
   a first nonferrous sheet and a second nonferrous sheet, the first nonferrous sheet adhesively mounted to the bottom face of the foam core layer, the first nonferrous sheet having a protective coating applied over a bottom surface; the second nonferrous sheet adhesively mounted to the top face of the foam core layer;
   a decorative layer applied over an upper surface of second nonferrous sheet and forming a panel core with the foam core layer and attached first and second nonferrous sheets;
   an edging mounted around a periphery of the panel core.

2. A portable floor panel according to claim 1, wherein the decorative layer is adhesively mounted to the second nonferrous sheet.

3. A portable floor panel according to claim 1, further comprising latch assemblies mounted to sides of the panel and configured to latch to complementary latch assemblies of adjacent panels.

4. A portable floor panel according to claim 1, wherein the first nonferrous layer and the second nonferrous layer each comprise an aluminum sheet.

5. A portable floor panel according to claim 1, wherein the decorative layer comprises a laminate.

6. A portable floor panel according to claim 3, further comprising an anchor element having a mounting portion mounted to each latch assembly, each anchor element extending through the first nonferrous sheet and into the reinforced foam layer.

7. A portable floor comprising:
a plurality of panels configured for connecting in an edge to edge relationship, each of the panels having an unsymmetrical construction about a center core layer, each of the floor panels comprising:
a layer of fiberglass reinforced closed cell water resistant foam forming the center core layer and having a top face and a bottom face, the layer of fiberglass reinforced closed cell water resistant foam comprising reinforced fiberglass strands dispersed throughout the foam;
a first nonferrous sheet and a second nonferrous sheet, the first nonferrous sheet adhesively mounted to the bottom face of the foam core layer, the first nonferrous sheet having a protective coating applied over a bottom surface; the second nonferrous sheet adhesively mounted to the top face of the foam core layer;
a decorative layer applied over an upper surface of second nonferrous sheet and forming a panel core with the foam core layer and attached first and second nonferrous sheets;
an edging attached around a periphery of the panel core.

8. A portable floor according to claim 7, further comprising transition elements configured for attaching to a periphery of the portable floor and having an upper surface sloping from an upper surface of the portable floor to an underlying surface.

9. A portable floor according to claim 7, further comprising latch assemblies configured to connect to complementary latch assemblies of adjacent panels.

10. A portable floor according to claim 7, wherein the decorative coating comprises a laminate.

11. A method of making a portable floor panel, the panel having an unsymmetrical construction about a center core layer; the method comprising:
providing a sheet of fiberglass reinforced closed cell water resistant foam forming the center core layer, the sheet of fiberglass reinforced closed cell water resistant foam comprising reinforced fiberglass strands dispersed throughout the foam;
applying a first nonferrous sheet to the bottom of the center foam layer with an adhesive, and pressing the first nonferrous sheet to the center foam layer and passing the nonferrous sheet and the center foam layer through pinch rollers;
applying a second nonferrous sheet to the top of the center foam layer with an adhesive, and pressing the second nonferrous sheet to the center foam layer and passing the nonferrous sheets and the center foam layer through pinch rollers;
applying a decorative layer to an upper surface of the second nonferrous sheet with an adhesive, pressing the decorative layer onto the second nonferrous sheet and passing the nonferrous sheets, the center foam layer and the decorative layer through pinch rollers.

12. The method according to claim 11, wherein the first nonferrous sheet comprises a first aluminum sheet and the second nonferrous sheet comprises a second aluminum sheet.

13. The method according to claim 12, wherein the first and second aluminum sheets are pretreated to remove oxides prior to being applied to the center foam layer.

14. The method according to claim 11, further comprising attaching extruded edge elements along sides of the panel.

15. The method according to claim 11, further comprising attaching a latch assembly along each side of the panel.

16. The method according to claim 14, further comprising forming a recess in a bottom of the floor panel and inserting an anchor element into the recess and mounting a latch assembly to the anchor element.

17. A portable floor panel having an unsymmetrical construction having an unsymmetrical number of layers about a center core layer, the floor panel comprising:
a layer of fiberglass reinforced closed cell water resistant foam forming the center core layer and having a top face and a bottom face, the layer of fiberglass reinforced closed cell water resistant foam comprising reinforced fiberglass strands dispersed throughout the foam;
a first nonferrous sheet and a second nonferrous sheet, the first nonferrous sheet adhesively mounted to the bottom face of the foam core layer, the first nonferrous sheet having a protective coating applied over a bottom surface; the second nonferrous sheet adhesively mounted to the top face of the foam core layer;
a decorative layer applied over an upper surface of second nonferrous sheet and forming a panel core with the foam core layer and attached first and second nonferrous sheets;
an edging mounted around a periphery of the panel core.

* * * * *